3,367,302
PRETZEL GLAZING APPARATUS
Karl Heinrich Schloder and Karl Georg Schloder, both of 29 Herrenstrasse, Moosberg, Germany,
Filed Apr. 23, 1964, Ser. No. 362,155
Claims priority, application Germany, July 5, 1963, Sch 33,512
10 Claims. (Cl. 118—30)

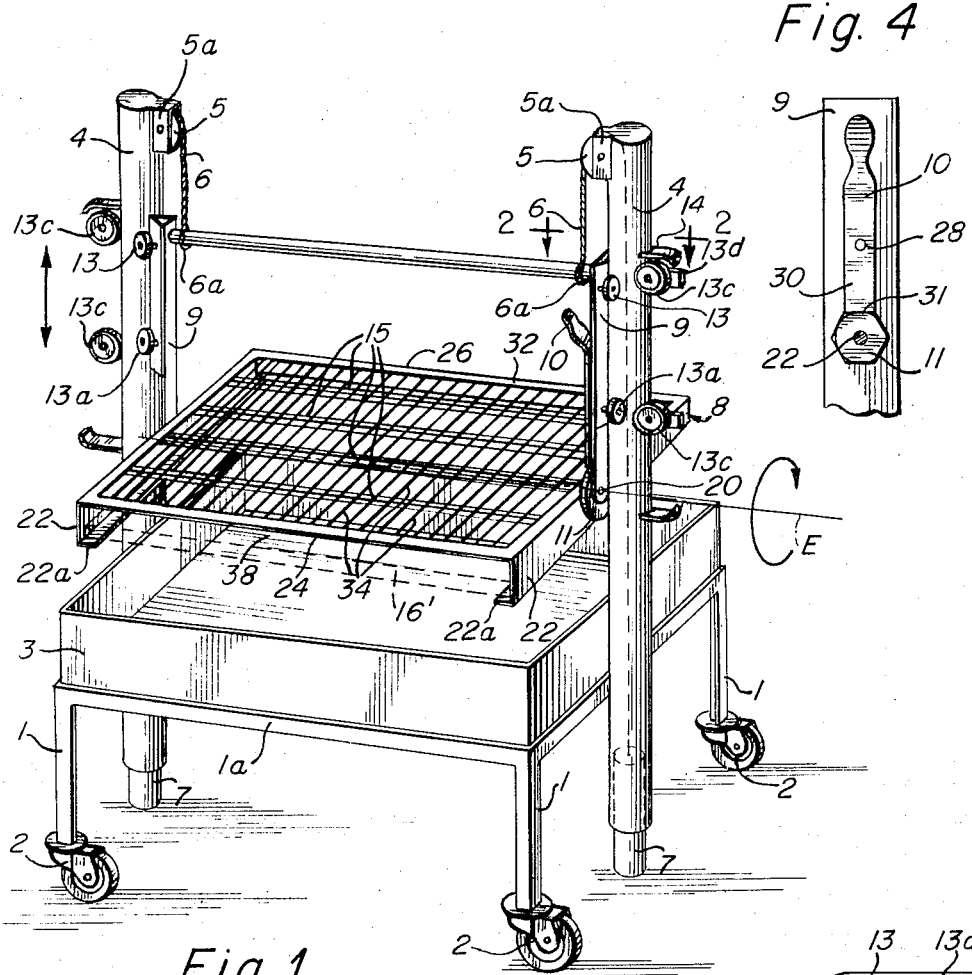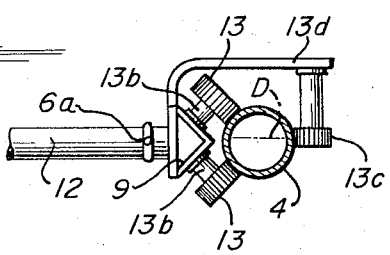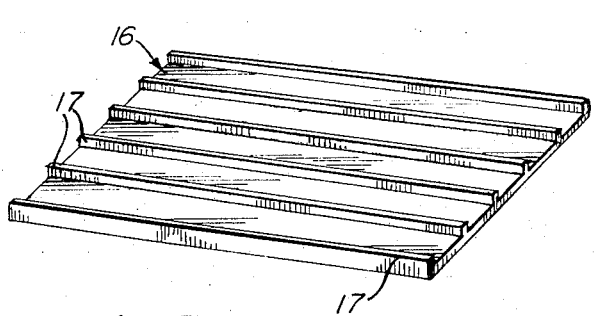
Fig. 4
Fig. 1
Fig. 2
Fig. 3
INVENTORS
Karl Heinrich Schloder
Karl Georg Schloder
BY Silverman & Cass
ATTORNEYS

# United States Patent Office 3,367,302
Patented Feb. 6, 1968

This invention relates to a novel apparatus for applying a glaze to a bakery product, such as a pretzel, by dipping the product prior to baking into the appropriate glazing solution without the baker contacting the solution.

Prior to baking thereof, bakery products such as pretzels require coating with a special solution which is caustic in character and salting so that the glazed, salty surface of the pretzel is realized after baking. An example of such a solution used for coating pretzels is 0.5% aqueous solution of bicarbonate of soda or sodium hydrochloride. In the larger commercial bakeries using automatic equipment, the raw pretzel dough usually is carried on a suitable conveyor to a station at which the dough is sprayed with the caustic solution, the salt is applied and the raw dough thereupon conveyed through the baking ovens. Under these circumstances, the pretzels, after being coated with the glazing solution but prior to baking, are not handled by the bakers and consequently, there is no problem of the caustic glazing solution coming in contact with the bakers' hands. However, such automatic conveyor equipment is expensive and eminently impractical for the relatively small bakery shops which are more or less in the nature of custom shops with a limited, specialty-type production.

Heretofore, such bakery shops have used dipping boards comprised of perforated sheets resistant to the caustic glazing solution which would be lowered into the solution carried in a tank. However, after the dipping board loaded with the raw pretzel dough was lifted from the solution tank, the pretzel dough was transferred manually to a baking oven. This equipment and procedure is unsatisfactory for many reasons including the obvious fact that the bakers' hands are required to contact the caustic glazing solution when the pretzel dough is transferred from the dipping board or sheet to the baking board. This procedure is cumbersome and inefficient.

Accordingly, the primary object of this invention is to provide apparatus of the character described which will permit raw pretzel dough to be glazed and thereafter baked without the baker or operator coming in contact with the caustic glazing solution. An ancillary object in this regard is to provide such apparatus which is especially suitable for use, both from an economical as well as technological standpoint, by the relatively small or custom baker shop as distinguished from large commercial baking plants that can use automatic and expensive equipment.

An important object of the invention is to provide apparatus for dipping pretzel dough into a glazing solution, which includes a dipping grate rotatably mounted on a horizontally oriented axis and movable independently along a vertical path for raising and lowering the grate relative to a glazing solution tank, said grate having a ledge formation spaced from the plane of the grate surface for removably mounting a flat board in association with said grate so that the grate and board can be rotated together for selectively transferring said dough from the grate to said board and vice versa.

Further objects of the invention include providing apparatus of the character described which is economical to manufacture and use; which can be used efficiently without requiring special training and/or skills; which can be serviced and cleaned easily; and which is characterzed by a construction which is compact and sturdy and especially practical and feasible for bakeries of relatively small size.

The foregoing and other objects of the invention will become apparent from the ensuing disclosure in which a preferred embodiment is described in detail and illustrated in the accompanying drawing. It is contemplated that minor changes may be made in the size, construction and arrangement of parts without departing from the scope or sacrificing any of the advantages of the invention.

In the drawing:

FIG. 1 is a perspective view of the apparatus for glazing pretzels constructed in accordance with the invention.

FIG. 2 is a sectional view taken through one of the guide tubes or standards along the line 2—2 of FIG. 1 and in the general direction indicated.

FIG. 3 is a perspective view of the combination pretzel shaping and baking board used with the apparatus embodying the invention.

FIG. 4 is an enlarged fragmentary elevational view showing the locking means for the rotatable grate of said apparatus.

Referring now to the drawing, in FIG. 1, the pretzel glazing apparatus embodying the invention is identified generally by the reference character A. Said apparatus A includes a base conveniently formed of metal channel members to provide the upright legs 1 supporting a generally open rectangular bed or platform 1a. Secured to the lower end of each leg 1 is a castor or a roller 2 and removably mounted on the platform 1a is a suitably dimensioned and shaped tank 3 for holding the glazing solution into which the bakery product is intended to be dipped. As seen in FIG. 1, the tank 3 opens upwardly. On a pair of opposite sides of the bed 1a are secured, as by welding or other suitable means, the vertically oriented hollow, cylindrical guide tubes or standards 4. To the upper end of each standard or tube 4 is rotatably mounted a pulley wheel 5 in the journal bracket 5a, said pulley wheels 5 facing one toward the other and overlying the tank 3. Threaded through the interior of each of the hollow standards 4 is a rope or line 6, the lower end of the rope 6 being secured to a counterweight 7 of suitable dimensions for reciprocable movement in the interior of the tube. Each line 6 is passed over a pulley 5 and its opposite end 6a is secured to the cross-bar 12 which supports a pair of elongate guide bars or parts 9, one at each end of the cross-bar. The bars are triangular in cross-section and comprise part of the elevator mechanism for raising and lowering the grate relative tank 3.

Referring to FIGS. 1 and 2, it will be appreciated that there are two pairs 13 and 13a of guide rollers mounted on each bar 9, the pair of rollers 13 being at the upper end and the pair 13a being at the bottom end of the bar on which it is mounted. The rollers 13 and 13a are freely rotatable on the shafts 13b and the wheels of each such pair 13 and 13a engage the tube at locations equally spaced from and on opposite sides of the diameter of the tube shown at D and vertically aligned respectively. Obviously, the shafts 13b are each perpendicular to the side of the bar 9 to which it is attached. Also, there is an L-shaped strap 13d which mounts the third wheel 13c which engages the tube 4 centered on the diameter D and on the portion of the circumference of the tube facing away from the bar 9. There are two such straps 13d and two wheels 13c, one below the other and at opposite ends of each bar 9. The rollers, 13, 13a and 13c of each threesome at the end of the bar 9 engage the tube 4 properly distributed over the circumference thereof to encompass the same and guide vertical movement of the bar 9 up and down. The stop 14 secured to each standard 4 prevents the bar 9 from rolling off the upper end of the standard against the lifting action of the weight 7.

The dipping grate 8 is pivotally secured to the bottom ends of and between the guide parts 9. One pivot connection of the grate 8 is shown at 20 with each such pivot connection being along a side 22 of the grate and midway between the front and back edges 24 and 26 thereof respectively. As seen in FIG. 4, a stop lever 10 is pivotally mounted at 28 on a bar 9 for engaging a locking disc 11 secured on a side frame part 22. The lower end 30 of the lever 10 is designed to engage a flat surface 31 of locking disc 11 for locking the grate 8 in a horizontal position shown in FIG. 1. Note that disc 11 is polyhedral in configuration to afford such a surface 31 to the lever 10 even after rotation of grate 8 through 180° from that shown in FIG. 1, as subsequently explained.

The dipping grate 8 includes an outer rectangular frame 32 for supporting parallel holding or grate bars 34 perpendicular to the pivot axis of the grate shown at E. These holding bars 34 are suitably spaced and define a supporting surface for the pretzels. Extending across the grate perpendicular to the bars 34, which define the supporting surface, are parallel cross members 15, said members 15 being located below the bars 34 when the grate is in the position illustrated, and extending parallel to the axis of rotation E. The distance between axis E and the cross-bar 12 is sufficient to permit pivotal movement of the grate 8 through 180°.

The sides 22 of the grate are sheet metal members and they extend downwardly from the frame 32. At its lower end, each member 22 has a right angle flange 22a, said flanges 22a facing inwardly one toward the other and aligned with one another along their full extent to provide a support ledge or shelf spaced below the grate surface. The side members 22 are tapered from edge 24 to edge 26 or front to back of the grate so that the opening 38 into the space between the flanges 22a and the grate bars 34 is greater at the front edge 24 as compared to that at the rear edge 26.

The combination shaping board and baking rack is identified generally by reference character 16, in FIG. 3. The board and rack 16 has upstanding parallel ribs 17 between which the pretzels are arranged in rows. The spacing between adjacent bars 17 is identical to that between adjacent members 15 on the grate and the bars and ribs extend in the same direction.

The board and rack 16 is suitably dimensioned to fit into the space between grate bars 34 and flanges 22a. First, the board 16 is covered with raw pretzel dough accommodated between adjacent ribs 17. Then the board 16 is inserted through entrance 38 into the grate 8 to the position shown in broken outline 16' in FIG. 1, supported on flanges 22a. The pretzels do not contact the grate bars because the ribs 17 upstand from the board 16 a distance greater than the thickness of the pretzel dough 50. Also, the ribs 17 and cross-members 15 are aligned respectively. After the shaping board 16 is inserted, it is lifted at the entrance 38 which is wider so that the ribs 17 on the shaping board and the cross-members 15 on the dipping grate come in contact with each other at the rear end 26, forming closed chambers for the pretzels in which the latter are held when the dipping grate is rotated 180°. Due to the turning of the dipping grate 8 with the shaping board 16 inserted, the pretzels are transferred from the shaping board to the dipping grate so that the shaping board can be removed again after lifting on the introduction side 38 without the pretzels deposited on the dipping grate being displaced. By lowering the dipping grate into the solution tank, the pretzels are dipped into the solution. When the pretzels have dipped sufficiently, the dipping grate is lifted by means of the raising and lowering mechanism and the excess solution returns to the solution tank. After the baking rack has been inserted and the dipping grate again rotated by 180°, the latter returns to its starting position, and the pretzels are again on the baking rack 16, by means of which the pretzels are transferred to the oven after salting. The baker does not have to touch the coated pretzel dough for placing it into the oven.

The solution tank is preferably heatable so that it is possible to boil the pretzels in the solution, if desired for another pretzel product.

As seen in FIG. 1, the lever 10 is shown in solid outline protruding outwardly from the bar 9 an exaggerated distance. Actually, the lever 10 will protrude outwardly only a distance insufficient to interfere with rotation of the grate 8 between said tubes 4.

It will be appreciated that the apparatus embodying the invention enables the pretzel dough to be carried on the board 16 and the board 16 assembled to the rotatable grate 8 for dipping and transport thereafter to the ovens, all without touching the pretzel dough after it is dipped. The ribs 17 and cross-members 15 are related in respective spacing thereof so that the pretzel dough is transferred to the grate members 34 between cross-members 15. This assures that the pretzel dough will be maintained in proper position between cross-members 15 during rotation of grate 8. Thus, the bars 17 and cross-members 15 comprise lateral holding means for the pretzels on the board 16 and grate respectively. Also, the rotation of the grate 8 after dipping and with board 16 removed, permits excess solution to return to the tank 3. There is no reservoir structure on the grate 8 for retaining glazing solution.

What it is desired to secure by Letters Patent is:

1. The apparatus for dipping pretzel dough to apply a glazed surface thereto prior to baking comprising, a base, an upwardly opening tank for the glazing solution supported on said base, a grate spaced above said tank and having a supporting surface for receiving the pretzel dough, an elevator mechanism connected to said base and rotatively supporting said grate above the tank for selectively raising and lowering said grate relative to said tank, depending flanges on opposite edges of said grate spaced from said supporting surface and adapted to receive a combination shaping and baking board for the pretzel dough, said flanges adapted to support said board in spaced relationship with respect to said grate supporting surface whereby the board may be moved relative to said grate supporting surface to place it in juxtaposition with said supporting surface such that upon rotation of said grate and shaping board the pretzel dough will be transferred from one to the other.

2. Apparatus as defined in claim 1 wherein said apparatus is provided with means for locking the grate against inadvertent rotation.

3. Apparatus as described in claim 1 in which said base has a pair of upstanding standards with said grate positioned between the standards, said elevator mechanism being supported by the standards.

4. Apparatus as described in claim 3 in which said mechanism includes a triangular shaped support bar alongside each standard, a plurality of rollers rotatable on each bar and engaging the adjacent standard around the circumference thereof to guide the mechanism in its vertical movement.

5. Apparatus according to claim 1 wherein said grate is provided with a plurality of cross-members which are adapted to be alined with ribs formed on the combination shaping and baking board, such that said ribs and cross-members cooperate to provide lateral retainer means for the pretzel dough upon joint rotation of said grate and baking board.

6. The apparatus according to claim 1 wherein said flanges are canted relative to said grate supporting surface such that when said combination shaping and baking board is supported thereon the rear edge of said board is closer to said supporting surface than the forward edge of said board whereby said board is adapted to be pivoted about the rear edge thereof to place said board in juxtaposition with said supporting surface immediately prior to rotation thereof.

7. Apparatus for dipping pretzel dough to apply a glazed surface thereto prior to baking comprising, a base, an upwardly opening tank for glazing solution supported on the base, a rotary grate spaced above said tank and having a supporting surface for receiving the dough, an elevator mechanism connected to said grate for selectively raising and lowering said grate relative to said tank, depending flanges on said grate spaced from said grate surface, and a combination shaping and baking board for said pretzel dough removably supported on said flanges and spaced from said grate surface, said flanges allowing said board to be moved vertically to place it in juxtaposition with said grate such that upon subsequent rotation of said grate the pretzel dough will be transferred from one to the other.

8. Apparatus as defined in claim 7 wherein said apparatus is provided with means for locking the grate against inadvertent rotation.

9. Dipping apparatus for glazing pretzels comprising a pair of vertically arranged standards, guide bar means slidable on the standard along the length thereof and an elevator mechanism for raising and lowering the guide bar means, a grate device having a supporting surface provided with a plurality of parallel cross-members, said grate being rotatably mounted to the bottom ends of said guide bar means between said standards, a base supporting said standards and having a dipping tank opening toward said grate device, said grate device being pivotal on an axis spaced above said tank and including supporting means for a shaping board, whereby said board is removably associated with said grate and movable therewith both rotatably and linearly, said shaping board being supported in spaced apart relationship with respect to said supporting surface on said grate and constructed and arranged to support pretzels thereon, said grate device and the associated board being selectively rotatable together for transferring the pretzels one from the other upon said rotation of the grate device, both prior and subsequent to lowering of the grate device into the dipping tank.

10. Dipping apparatus for glazing an article comprising a pair of vertically arranged standards, guide bar means mounted on and slidable with respect to said standards, an elevator mechanism for raising and lowering said guide bar means, a grate device pivotally mounted on said guide bar means between said standards, a base supporting said standards and having a dipping tank opening upward towards said grate device, said grate device being spaced above said tank and including supporting means for a board adapted to be removably associated therewith, said supporting means adapted to position said board with respect to said grate device such that the rear edge of said board is closer to said grate than the forward edge thereof, whereby pivotal movement of said board relative to said grate will place said board in juxtaposition with said grate device such that upon subsequent rotation of the grate device and said board the articles may be transferred one from the other without the danger of slippage from the space therebetween.

References Cited
UNITED STATES PATENTS

| | | | |
|---|---|---|---|
| 851,236 | 4/1907 | Hartog | 118—30 |
| 875,889 | 1/1908 | Bradshaw | 134—164 |
| 2,083,634 | 6/1937 | Brackett | 118—323 X |
| 2,437,109 | 3/1948 | Maquat. | |
| 2,588,125 | 3/1952 | Knowland et al. | 118—323 X |
| 3,167,454 | 1/1965 | Tompson | 118—425 |

CHARLES A. WILLMUTH, *Primary Examiner.*

J. P. McINTOSH, *Assistant Examiner.*

UNITED STATES PATENT OFFICE
CERTIFICATE OF CORRECTION

Patent No. 3,367,302                 February 6, 1968

Karl Heinrich Schloder et al.

It is hereby certified that error appears in the above numbered patent requiring correction and that the said Letters Patent should read as corrected below.

Column 1, line 40, before "oven." insert -- board, salted and the loaded board placed in the baking --.

Signed and sealed this 25th day of March 1969.

(SEAL)
Attest:

Edward M. Fletcher, Jr.                EDWARD J. BRENNER
Attesting Officer                    Commissioner of Patents